(12) United States Patent
Yoshimura et al.

(10) Patent No.: US 6,531,532 B1
(45) Date of Patent: Mar. 11, 2003

(54) COMPOSITION FOR OPTICAL MATERIALS

(75) Inventors: Yuichi Yoshimura, Chiba-ken (JP); Motoharu Takeuchi, Tokyo (JP); Atsuki Niimi, Tokyo (JP); Hiroshi Horikoshi, Chiba-ken (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 09/551,846

(22) Filed: Apr. 18, 2000

(30) Foreign Application Priority Data

Apr. 23, 1999 (JP) ............................ 11-116563
Nov. 19, 1999 (JP) ............................ 11-330597

(51) Int. Cl.$^7$ ................................ C08K 3/30
(52) U.S. Cl. .................... 524/418; 524/420; 524/419
(58) Field of Search ................ 524/402, 418, 524/419; 528/403, 405, 374

(56) References Cited

U.S. PATENT DOCUMENTS 5,945,504 A * 8/1999 Amagi et al. ............... 528/373
6,124,424 A * 9/2000 Okazaki et al. ............. 528/405

FOREIGN PATENT DOCUMENTS

| DE | 1545025 | 1/1972 |
| EP | 785194 A1 | 1/1997 |
| GB | 1518139 A | 7/1978 |
| NL | 7208811 | 12/1973 |

OTHER PUBLICATIONS

Aliev A.D. et al., "AnionIc polymerisation of episulphides with elemental sulphur"; NATURE, vol. 280, Aug. 10, 1979, p. 5725 Xp002170327.
Zussman, M.P., et al., "Backbone–assisted Reactions of Polymers 2", in *Macromolecules*, vol. 14(1981), pp. 1148–1153.XP002170328.

* cited by examiner

*Primary Examiner*—Edward J. Cain
*Assistant Examiner*—Katarzyna Wyrozebski
(74) *Attorney, Agent, or Firm*—Antonelli, Terry, Stout & Kraus, LLP

(57) ABSTRACT

Optical materials which are cured compositions of a mixture of (a) a compound comprising sulfur and (b) an inorganic compound comprising at least one atom selected from the group consisting of sulfur atom and selenium atom, the optical material being obtained by curing the compositions by polymerization. Optical materials having a large refractive index and a large Abbe number are obtained from the compositions.

17 Claims, No Drawings

COMPOSITION FOR OPTICAL MATERIALS

BACKGROUND OF THE INVENTION

1. Field of the Invention

The present invention relates to an optical material for plastic lenses, prisms, optical fibers, information recording substrates and filters, and, more particularly, to an optical lens such as a plastic lens for glasses.

2. Description of the Related Arts

Plastic materials have widely been used for various optical materials, particularly as lenses of glasses, because of light weight, toughness and easiness of tinting. The properties required for optical materials, particularly for lenses of glasses, are a low specific gravity, excellent transparency, suppressed yellow color and optical properties which are a large refractive index and a large Abbe number. A large refractive index is important to decrease the thickness of a lens. A large Abbe number is important to decrease chromatic aberration of a lens. The present inventors have discovered novel episulfide compounds which can provide optical materials having a small thickness and a small chromatic aberration, i.e., a refractive index of 1.7 or larger and an Abbe number of 35 or larger, as disclosed in the specifications of Japanese Patent Application Laid-Open Nos. Heisei 9(1997)-71580, Heisei 9(1997)-110979 and Heisei 9(1997)-255781. However, since the optical materials discovered above have refractive indices of about 1.71, an optical material having a higher refractive index has been desired.

SUMMARY OF THE INVENTION

An object of the present invention is to provide a composition for optical materials having a large Abbe number and a refractive index exceeding refractive indices of conventional materials and an optical material obtained by curing the composition by polymerization.

As the result of extensive studies by the present inventors to achieve the above object, it was found that using an inorganic compound comprising at least one atom of sulfur atom and selenium atom is advantageous for obtaining a composition having a refractive index exceeding those of conventional materials. The present invention has been completed based on this knowledge.

The present invention provides a composition for optical materials which comprises a mixture of a compound having one or more structures represented by formula (1) in one molecule and one or more inorganic compounds comprising at least one atom of sulfur atom and selenium atom, formula (1) being:

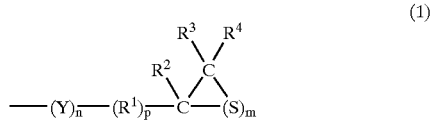

(1)

wherein $R^1$ represents a hydrocarbon group having 1 to 10 carbon atoms, $R^2$, $R^3$ and $R^4$ each represents hydrogen atom or a hydrocarbon group having 1 to 10 carbon atoms, Y represents O, S, Se or Te, m represents a number of 1 to 5, n represents a number of 0 to 5 and p represents 0 or 1.

DESCRIPTION OF THE PREFERRED EMBODIMENTS

The compound comprising one or more structures represented by formula (1) in one molecule which is used in the present invention provides a large refractive index, a large Abbe number and an excellent balance between these properties when the compound is used for an optical material. In formula (1), $R^1$ preferably represents methylene group or ethylene group and $R^2$, $R^3$ and $R^4$ each preferably represents hydrogen atom. Y represents O, S, Se or Te and preferably S, Se or Te when a still larger refractive index is desired. m represents a number of 1 to 5, preferably 1 or 2 and more preferably 1. n represents a number of 0 to 5, preferably a number of 0 to 4 and more preferably 0 or 1. p represents 0 or 1 and preferably 1.

As the compound having one or more groups represented by formula (1) in one molecule which is used in the present invention, any compound satisfying this condition can be used. Compounds having two or more groups represented by formula (1) in one molecule are preferable. Specific examples of the compound having the structures represented by formula (1) include the following compounds:

(A) Organic compounds having epithio groups
(B) Organic compounds having epithioalkyloxy groups
(C) Organic compounds having epithioalkylthio groups
(D) Organic compounds having epithioalkylseleno groups
(E) Organic compounds having epithioalkyltelluro groups Organic compounds (A), (B), (C), (D) and (E) have a chain backbone structure, branched backbone structure, an alicyclic backbone structure, an aromatic backbone structure or a heterocyclic backbone structure having nitrogen atom, oxygen atom, sulfur atom, selenium atom or tellurium atom. The organic compounds may have a combination of epithio group, epithioalkyloxy groups, epithioalkylthio groups, epithioalkylseleno group and epithioalkyltelluro group in one molecule. The organic compound may also have sulfide linkages, selenide linkages, telluride linkages, ether linkages, sulfone linkages, ketone linkages, ester linkages, amide linkages or urethane linkages.

Preferable examples of the organic compound having epithio groups of compound (A) include compounds obtained by replacing one or more epoxy groups in compounds having epoxy groups (not glycidyl groups) with epithio groups. Specific examples of the above compound include:

Organic compounds having a chain aliphatic backbone structure such as 1,1-bis(epithioethyl)methane, 1-(epithioethyl)-1-(β-epithiopropyl)methane, 1,1-bis(β-epithiopropyl)methane, 1-(epithioethyl)-1-(β-epithiopropyl)ethane, 1,2-bis(β-epithiopropyl)ethane, 1-(epithioethyl)-3-(β-epithiopropyl)butane, 1,3-bis(β-epithiopropyl)propane, 1-(epithioethyl)-4-(β-epithiopropyl)pentane, 1,4-bis(β-epithiopropyl)butane, 1-(epithio-ethyl)-5-(β-epithiopropyl)hexane, 1-(epithioethyl)-2-(γ-epithiobutylthio)-ethane, 1-(epithioethyl)-2-[2-(γ-epithiobutylthio)ethylthio]ethane, tetrakis-(β-epithiopropyl)methane, 1,1,1-tris(β-epithiopropyl)propane, 1,3-bis(β-epithiopropyl)-1-(β-epithiopropyl)-2-thiapropane and 1,5-bis(β-epithiopropyl)-2,4-bis(β-epithiopropyl)-3-thiapentane;

Compounds having alicyclic backbone structures including:

Compounds having one alicyclic structure such as 1,3- and 1,4-bis(epithioethyl)cyclohexanes, 1,3- and 1,4-bis(β-epithiopropyl)cyclohexanes, 2,5-bis(epithioethyl)-1,4-dithiane, 2,5-bis(β-epithiopropyl)-1,4-dithiane, 4-epithioethyl-1,2-cyclohexene sulfide and 4-epoxy-1,2-cyclohexene sulfide; and Compounds having two or more alicyclic structures such as 2,2-bis[4-(epithioethyl)cyclohexyl]-propane, 2,2-bis[4-(β-epithiopropyl)cyclohexyl]propane, bis[4-(epithioethyl)

cyclohexyl]methane, bis[4-(β-epithiopropyl)cyclohexyl]methane, bis[4-(β-epithiopropyl)cyclohexyl]sulfide and bis[4-(epithioethyl)cyclohexyl]sulfide; and Compounds having aromatic backbone structures including:

Compounds having one aromatic backbone structure such as 1,3- and 1,4-bis(epithioethyl)benzenes and 1,3- and 1,4-bis(β-epithiopropyl)benzenes;

Compounds having two or more aromatic backbone structures such as bis[4-(epithioethyl)phenyl]methane, bis[4-(β-epithiopropyl)phenyl]methane, 2,2-bis[4-(epithioethyl)phenyl]propane, 2,2-bis[4-(β-epithiopropyl)phenyl]propane, bis[4-(epithioethyl)phenyl]sulfide, bis[4-(β-epithiopropyl)phenyl]sulfide, bis[4-(epithioethyl)phenyl]sulfone, bis[4-(β-epithiopropyl)phenyl]sulfone, 4,4'-bis(epithioethyl)biphenyl, 4,4'-bis(β-epithiopropyl)biphenyl and the like compounds; and Compounds obtained by replacing at least one hydrogen atom in the epithio group in the above compounds with methyl group.

Preferable examples of the organic compound having one or more epithioalkyloxy groups of compound (B) include compounds obtained by replacing one or more glycidyl groups in epoxy compounds derived from an epihalohydrin with epithioalkyloxy groups (thioglycidyl groups). Specific examples of the above epoxy compound include epoxy compounds derived from phenols which are produced by condensation of epihalohydrins with polyhydric phenols such as hydroquinone, catechol, resorcinol, bisphenol A, bisphenol F, bisphenol sulfone, bisphenol ether, bisphenol sulfide, halogenated bisphenol A and novolak resins; epoxy compounds derived from alcohols which are produced by condensation of epihalohydrins with polyhydric alcohols such as ethylene glycol, diethylene glycol, triethylene glycol, polyethylene glycol, propylene glycol, dipropylene glycol, polypropylene glycol, 1,3-propanediol, 1,4-butanediol, 1,6-hexanediol, neopentyl glycol, glycerol, trimethylolpropane trimethacrylate, pentaerythritol, 1,3- and 1,4-cyclohexanediols, 1,3- and 1,4-cyclohexanedimethanols, hydrogenated bisphenol A, adducts of ethylene oxide and bisphenol A and adducts of propylene oxide and bisphenol A; epoxy compounds of glycidyl esters which are produced by condensation of epihalohydrins with polybasic carboxylic acid compounds such as adipic acid, sebacic acid, dodecanedicarboxylic acid, dimer acid, phthalic acid, isophthalic acid, terephthalic acid, tetrahydrophthalic acid, methyltetrahydrophthalic acid, hexahydrophthalic acid, hexahydroisophthalic acid, hexahydroterephthalic acid, HET acid, nadic acid, maleic acid, succinic acid, fumaric acid, trimellitic acid, benzenetetracarboxylic acid, benzophenonetetracarboxylic acid, naphthalenedicarboxylic acid and diphenyldicarboxylic acid; epoxy compounds derived from amines which are produced by condensation of epihalohydrins with primary diamines such as ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, 1,7-diaminoheptane, 1,8-diaminooctane, bis(3-aminopropyl)ether, 1,2-bis(3-aminopropoxy)ethane, 1,3-bis(3-aminopropoxy)-2,2'-dimethylpropane, 1,2-, 1,3- and 1,4-bisaminocyclohexanes, 1,3- and 1,4-bisaminomethylcyclohexanes, 1,3- and 1,4-bisaminoethylcyclohexanes, 1,3- and 1,4-bisaminopropylcyclohexanes, hydrogenated 4,4'-diaminodiphenylmethane, isophoronediamine, 1,4-bisaminopropylpiperadine, m- and p-phenylenediamines, 2,4- and 2,6-tolylenediamines, m- and p-xylylenediamines, 1,5- and 2,6-naphthalenediamines, 4,4'-diaminodiphenylmethane, 4,4'-diaminodiphenyl ether and 2,2-(4,4'-diaminodiphenyl)propane; epoxy compounds derived from amines which are produced by condensation of epihalohydrins with secondary diamines such as N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,6-diaminohexane, piperadine, 2-methylpiperadine, 2,5- and 2,6-dimethylpiperadines, homopiperadine, 1,1-di(4-piperadyl)methane, 1,2-di(4-piperidyl)ethane, 1,3-di(4-piperidyl)propane and 1,4-di(4-piperidyl)butane; and epoxy compounds of urethane produced from the above polyhydric alcohols, the above phenols, diisocyanates and glycidol.

More specific examples of compound (B) include:

Compounds having a chain aliphatic backbone structure such as bis(β-epithiopropyl)ether, bis(β-epithiopropyloxy)methane, 1,2-bis(β-epithiopropyloxy)ethane, 1,3-bis(β-epithiopropyloxy)propane, 1,2-bis(β-epithiopropyloxy)propane, 1-(β-epithiopropyloxy)-2-(β-epithiopropyloxymethyl)propane, 1,4-bis(β-epithiopropyloxy)butane, 1,3-bis(β-epithiopropyloxy)butane, 1-(β-epithiopropyloxy)-3-(β-epithiopropyloxymethyl)butane, 1,5-bis(β-epithiopropyloxy)pentane, 1-(β-epithiopropyloxy)-4-(β-epithiopropyloxymethyl)pentane, 1,6-bis(β-epithiopropyloxy)hexane, 1-(β-epithiopropyloxy)-5-(β-epithiopropyloxymethyl)hexane, 1-(β-epithiopropyloxy)-2-[(2-β-epithiopropyloxyethyl)oxy]ethane, 1-(β-epithiopropyloxy)-2-[[2-(2-β-epithiopropyloxyethyl)oxyethyl]oxy]ethane, tetrakis(β-epithiopropyloxymethyl)methane, 1,1,1-tris(β-epithiopropyloxymethyl)propane, 1,5-bis(β-epithiopropyloxy)-2-(β-epithiopropyloxymethyl)-3-thiapentane, 1,5-bis(β-epithiopropyloxy)-2,4-bis(β-epithiopropyloxymethyl)-3-thiapentane, 1-(β-epithiopropyloxy)-2,2-bis(β-epithiopropyloxymethyl)-4-thiahexane, 1,5,6-tris(β-epithiopropyloxy)-4-(β-epithiopropyloxymethyl)-3-thiahexane, 1,8-bis(β-epithiopropyloxy)-4-(β-epithiopropyloxymethyl)-3,6-dithiaoctane, 1,8-bis(β-epithiopropyloxy)-4,5-bis(β-epithiopropyloxymethyl)-3,6-dithiaoctane, 1,8-bis(β-epithiopropyloxy)-4,4-bis(β-epithiopropyloxymethyl)-3,6-dithiaoctane, 1,8-bis(β-epithiopropyloxy )-2,4,5-tris(β-epithiopropyloxymethyl)-3,6-dithiaoctane, 1,8-bis(β-epithiopropyloxy)-2,5-bis(β-epithiopropyloxymethyl)-3,6-dithiaoctane, 1,9-bis(β-epithiopropyloxy)-5-(β-epithiopropyloxymethyl)-5-[(2-β-epithiopropyloxyethyl)oxymethyl]-3,7-dithianonane, 1,10-bis(β-epithiopropyloxy)-5,6-bis[(2-β-epithiopropyloxyethyl)oxy]-3,6,9-trithiadecane, 1,11-bis(β-epithiopropyloxy)-4,8-bis(β-epithiopropyloxymethyl)-3,6,9-trithiaundecane, 1,11-bis(β-epithiopropyloxy)-5,7-bis(β-epithiopropyloxymethyl)-3,6,9-trithiaundecane, 1,11-bis(β-epithiopropyloxy)-5,7-[(2-β-epithiopropyloxyethyl)oxymethyl]-3,6,9-trithiaundecane and 1,11-bis(β-epithiopropyloxy)-4,7-bis(β-epithiopropyloxymethyl)-3,6,9-trithiaundecane;

Compounds having an alicyclic backbone structure such as 1,3- and 1,4-bis(β-epithiopropyloxy)cyclohexanes, 1,3- and 1,4-bis(β-epithiopropyloxymethyl)cyclohexanes,bis[4-

(β-epithiopropyloxy)cyclohexyl]methane, 2,2-bis[4-(β-epithiopropyloxy)cyclohexyl]propane, bis[4-(β-epithiopropyloxy)cyclohexyl]sulfide, 2,5-bis(β-epithiopropyloxymethyl)-1,4-dithiane and 2,5-bis(β-epithiopropyloxyethyloxymethyl)-1,4-dithiane; and Compounds having aromatic backbone structures including:

Compounds having one aromatic backbone structure such as 1,3- and 1,4-bis(β-epithiopropyloxy)benzenes and 1,3- and 1,4-bis(β-epithiopropyloxymethyl)benzenes;

Compounds having two or more aromatic backbone structures such as bis[4-(β-epithiopropyloxy)phenyl]methane, 2,2-bis[4-(β-epithiopropyloxy)phenyl]propane, bis[4-(β-epithiopropyloxy)phenyl]sulfide, bis[4-(β-epithiopropyloxy)phenyl]sulfone and 4,4'-bis(β-epithiopropyloxy) biphenyl; and Compounds obtained by replacing at least one hydrogen atom in the epithio group in the above compounds with methyl group.

Preferable examples of the organic compound having one or more epithioalkylthio groups of compound (C) include compounds obtained by replacing one or more epoxyalkylthio groups (specifically, β-epoxypropylthio groups) in epoxy compounds derived from a compound having mercapto group and an epihalohydrin with epithioalkylthio groups. Specific examples of the above compound include:

Organic compounds having a chain aliphatic backbone structure such as bis(β-epithiopropyl)sulfide, bis(β-epithiopropyl)disulfide, bis(β-epithiopropyl)trisulfide, bis(β-epithiopropylthio)methane, bis(β-epithiopropyldithio)methane, bis(β-epithiopropyldithio)ethane, bis(β-epithiopropyldithioethyl)sulfide, bis(β-epithiopropyldithioethyl)disulfide, 1,2-bis(β-epithiopropylthio)ethane, 1,3-bis(β-epithiopropylthio)propane, 1,2-bis(β-epithiopropylthio)propane, 1-(β-epithiopropylthio)-2-(β-epithiopropylthiomethyl)propane, 1,4-bis(β-epithiopropylthio)butane, 1,3-bis(β-epithiopropylthio)butane, 1-(β-epithiopropylthio)-3-(β-epithiopropylthiomethyl)-butane, 1,5-bis(β-epithiopropylthio)pentane, 1-(,β-epithiopropylthio)-4-(β-epithiopropylthiomethyl)pentane, 1,6-bis(β-epithiopropylthio)hexane, 1-(β-epithiopropylthio)-5-(β-epithiopropylthiomethyl)hexane, 1-(β-epithiopropylthio)-2-[(2-β-epithiopropylthioethyl)thio]ethane, 1-(β-epithiopropylthio)-2-[[2-(2-β-epithiopropylthioethyl)thioethyl]thio]ethane; tetrakis(β-epithiopropylthiomethyl)methane, tetrakis(β-epithiopropyldithiomethyl)methane, 1,1,1-tris(β-epithiopropylthiomethyl)propane, 1,2,3-tris(β-epithiopropyldithio)propane, 1,5-bis(β-epithiopropylthio)-2-(β-epithiopropylthiomethyl)-3-thiapentane, 1,5-bis(β-epithiopropylthio)-2,4-bis(β-epithiopropylthiomethyl)-3-thiapentane, 1,6-bis(β-epithiopropyldithiomethyl)-2-(β-epithiopropyldithioethylthio)-4-thiahexane, 1-(β-epithiopropylthio)-2,2-bis(β-epithiopropylthiomethyl)-4-thiahexane, 1,5,6-tris(β-epithiopropylthio)-4-(β-epithiopropylthiomethyl)-3-thiahexane, 1,8-bis(β-epithiopropylthio)-4-(β-1-epithiopropylthiomethyl)-3,6-dithiaoctane, 1,8-bis(β-epithiopropylthio)-4,5-bis(β-epithiopropylthiomethyl)-3,6-dithiaoctane, 1,8-bis(β-epithiopropylthio)-4,4-bis(β-epithiopropylthiomethyl)-3,6-dithiaoctane, 1,8-bis(β-epithiopropylthio)2,4,5-tris(β-epithiopropylthiomethyl)-3,6-dithiaoctane, 1,8-bis(β-epithiopropylthio)-2,5-bis(β-epithiopropylthiomethyl)-3,6-dithiaoctane, 1,9-bis(β-epithiopropylthio)-5-(β-epithiopropylthiomethyl)-5-[(2-β-epithiopropylthioethyl)thiomethyl]-3,7-dithianonane, 1,10-bis(β-epithiopropylthio)-5,6-bis[(2-β-epithiopropylthioethyl)thio]-3,6,9-trithiadecane, 1,11-bis(β-epithiopropylthio)-4,8-bis(β-epithiopropylthiomethyl)-3,6,9-trithiaundecane, 1,11-bis(β-epithiopropylthio)-5,7-bis(β-epithiopropylthiomethyl)-3,6,9-trithiaundecane, 1,11-bis(β-epithiopropylthio)-5,7-[(2-β-epithiopropylthioethyl)thiomethyl]-3,6,9-trithiaundecane and 1,11-bis(β-epithiopropylthio)-4,7-bis(β-epithiopropylthiomethyl)-3,6,9-trithia-undecane;

Chain compounds having an ester group and an epithioalkylthio group such as tetra[2-(β-epithiopropylthio)acetylmethyl]methane, 1,1,1-tri[2-(β-epithiopropylthio)acetylmethyl]propane, tetra[2-(β-epithiopropylthiomethyl)acetylmethyl]methane and 1,1,1-tri[2-(β-epithiopropylthiomethyl)acetylmethyl]propane;

Compounds having alicyclic backbone structures including:

Compounds having one alicyclic backbone structure such as 1,3- and 1,4-bis(β-epithiopropylthio)cyclohexanes, 1,3- and 1,4-bis(β-epithiopropylthiomethyl)cyclohexanes, 2,5-bis(β-epithiopropylthiomethyl)-1,4-dithiane; 2,5-bis(β-epithiopropyldithiomethyl)-1,4-dithiane and 2,5-bis(β-epithiopropylthioethylthiomethyl)-1,4-dithiane; and Compounds having two or more alicyclic backbone structures such as bis[4-(β-epithiopropylthio)cyclohexyl]methane, 2,2-bis[4-(β-epithiopropylthio)cyclohexyl]propane and bis[4-(β-epithiopropylthio)cyclohexyl]sulfide;

Compounds having aromatic backbone structures including:

Compounds having one aromatic backbone structure such as 1,3- and 1,4-bis(β-epithiopropylthio)benzenes, 1,3- and 1,4-bis(β-epithiopropylthiomethyl)benzenes and 1,3- and 1,4-bis(β-epithiopropyldithiomethyl)benzenes; and Compounds having two or more aromatic backbone structures such as bis[4-(β-epithiopropylthio)phenyl]methane, 2,2-bis[4-(β-epithiopropylthio)phenyl]propane, bis[4-(β-epithiopropylthio)phenyl]sulfide, bis[4-(β-epithiopropylthio)phenyl]sulfone and 4,4'-bis(β-epithiopropylthio)biphenyl; and Compounds obtained by replacing at least one hydrogen atom in the epithio group in the above compounds with methyl group.

Preferable examples of the organic compound having epithioalkylseleno group of compound (D) include compounds obtained by replacing one or more epoxyalkylseleno groups (specifically, β-epoxypropylseleno groups) in epoxy compounds derived from an epihalohydrin and selenium metal or a selenium compound such as an alkali metal selenide, an alkali metal selenol, an alkyl (aryl) selenol and hydrogen selenide with epithioalkylseleno groups. Specific examples of the above compound include:

Organic compounds having a chain aliphatic backbone structure such as bis(β-epithiopropyl)selenide, bis(β-epithiopropyl)diselenide, bis(β-epithiopropyl)triselenide, bis(β-epithiopropylseleno)methane, 1,2-bis(β-epithiopropylseleno)ethane, 1,3-bis(β-epithiopropylseleno)propane, 1,2-bis(β-epithiopropylseleno)propane, 1-(β-epithiopropylseleno)-2-(β-epithiopropylselenomethyl)propane, 1,4-bis(β-epithiopropylseleno)butane, 1,3-bis(β-epithiopropylseleno)butane, 1-(β-epithiopropylseleno)-3-(β-epithiopropylselenomethyl)butane, 1,5-bis(β-epithiopropylseleno)pentane, 1-(β-epithiopropylseleno)-4-(β-epithiopropylselenomethyl)pentane, 1,6-bis(β-epithiopropylseleno)hexane, 1-(β-epithiopropylseleno)-5-(β-epithiopropylselenomethyl)hexane, 1-(β-epithiopropylseleno)-2-[(2-β-epithiopropylselenoethyl)thio]ethane, 1-(β-epithiopropylseleno)-2-[[2-(2-β-epithiopropylselenoethyl)selenoethyl]thio]ethane, tetrakis- (β-epithiopropylselenomethyl)methane, 1,1,1-tris(β-epithiopropylselenomethyl)propane, 1,5-bis(β-epithiopropylseleno)-2-(β-epithiopropylselenomethyl)-3-thiapentane, 1,5-bis(β-epithiopropylseleno)-2,4-bis(β-epithiopropylselenomethyl)-3-thiapentane, 1-(β-epithiopropylseleno)-2,2-bis(β-epithiopropylselenomethyl)-4-thiahexane, 1,5,6-tris(β-epithiopropylseleno)-4-(β-epithiopropylselenomethyl)-3-thiahexane, 1,8-bis(β-epithiopropylseleno)-4-(β-epithiopropylselenomethyl)-3,6-dithiaoctane, 1,8-bis(β-epithiopropylseleno)-4,5-bis(β-epithiopropylselenomethyl)-3,6-dithiaoctane, 1,8-bis(β-epithiopropylseleno)-4,4-bis(β-epithiopropylselenomethyl)-3,6-dithiaoctane, 1,8-bis(β-epithiopropylseleno)-2,4,5-tris(β-epithiopropylselenomethyl)-3,6-dithiaoctane, 1,8-bis(β-epithiopropylseleno)-2,5-bis(β-epithiopropylselenomethyl)-3,6-dithiaoctane, 1,9-bis(β-epithiopropylseleno)-5-(β-epithiopropylselenomethyl)-5-[(2-β-epithiopropylselenoethyl)selenomethyl]-3,7-dithianonane, 1,10-bis(β-epithiopropylseleno)-5,6-bis[(2-β-epithiopropylselenoethyl)thio]-3,6,9-trithiadecane, 1,11-bis(β-epithiopropylseleno)-4,8-bis(β-epithiopropylselenomethyl)-3,6,9-trithiaundecane, 1,11-bis(β-epithiopropylseleno)-5,7-bis(β-epithiopropylselenomethyl)-3,6,9-trithiaundecane, 1,11-bis(β-epithiopropylseleno)-5,7-[(2-β-epithiopropylselenoethyl)selenomethyl]-3,6,9-trithiaundecane, 1,11-bis(β-epithiopropylseleno)-4,7-bis(β-epithiopropylselenomethyl)-3,6,9-trithiaundecane, tetra[2-β-epithiopropylseleno)acetylmethyl]methane, 1,1,1-tri[2-β-epithiopropylseleno)acetylmethyl]propane, tetra[2-β-epithiopropylselenomethyl)acetylmethyl]methane, 1,1,1-tri[2-(β-epithiopropylselenomethyl)acetylmethyl]propane, bis(5,6-epithio-β-selenohexyl)selenide, 2,3-bis(6,7-thioepoxy-1-selena-4-selenoheptyl)-1-(3,4-thioepoxy-1-selenobutyl)propane, 1,1,3,3-tetrakis(4,5-thioepoxy-2-selenopentyl)-2-selenapropane, bis(4,5-thioepoxy-2-selenopentyl)-3,6,9-triselenaundecane-1,11-bis(3,4-thioepoxy-1-selenobutyl), 1,4-bis(3,4-thioepoxy-1-selenobutyl)-2,3-bis(6,7-thioepoxy-1-selena-4-selenoheptyl)butane, tris(4,5-thioepoxy-2-selenopentyl)-3-selena-6-thiaoctane-1,8-bis(3,4-thioepoxy-1-selenobutyl), bis(5,6-epithio-3-selenohexyl)telluride, 2,3-bis(6,7-thioepoxy-1-tellura-4-selenoheptyl)1-(3,4-thioepoxy-1-selenobutyl)propane, 1,1,3,3-tetrakis(4,5-thioepoxy-2-selenopentyl)-2-tellurapropane, bis(4,5-thioepoxy-2-selenopentyl)-3,6,9-tritelluraundecane-1,1,1-bis(3,4-thioepoxy-1-selenobutyl), 1,4-bis(3,4-thioepoxy-1-selenobutyl)-2,3-bis(6,7-thioepoxy-1-tellura-4-selenoheptyl)butane and tris(4,5-thioepoxy-2-selenopentyl)-3-tellura-6-thiaoctane-1,8-bis(3,4-thioepoxy-1-selenobutyl);

Compounds having an alicyclic backbone structure such as 1,3- and 1,4-bis(β-epithiopropylseleno)cyclohexanes, 1,3- and 1,4-bis(β-epithiopropylselenomethyl)cyclohexanes, bis[4-(β-epithiopropylseleno)cyclohexyl]methane, 2,2-bis[4-(β-epithiopropylseleno)cyclohexyl]propane, bis[4-(β-epithiopropylseleno)cyclohexyl]sulfide, 2,5-bis(β-epithiopropyl-selenomethyl)-1,4-dithiane, 2,5-bis(β-epithiopropylselenoethylthiomethyl)-1,4-dithiane; 2,3-, 2,5- and 2,6-bis(3,4-epithio-1-selenobutyl)-1,4-diselenanes, 2,3-, 2,5- and 2,6-bis(4,5-epithio-2-selenopentyl)-1,4-diselenanes, 2,4-, 2,5- and 5,6-bis(3,4-epithio-1-selenobutyl)-1,3-diselenanes, 2,4-, 2,5- and 5,6-bis(4,5-epithio-2-selenopentyl)-1,3-diselenanes, 2,3-, 2,5-, 2,6- and 3,5-bis(3,4-epithio-1-selenobutyl)-1-thia-4-selenanes, 2,3-, 2,5-, 2,6- and 3,5-bis(4,5-epithio-2-selenopentyl)-1-thia-4-selenanes, 2,4- and 4,5-bis(3,4-epithio-1-selenobutyl)-1,3-diselenolanes, 2,4- and 4,5-bis(4,5-epithio-2-selenopentyl)-1,3-diselenolanes, 2,4-, 2,5- and 4,5-bis(3,4-epithio-1-selenobutyl)-1-thia-3-selenolanes, 2,4-, 2,5- and 4,5-bis(4,5-epithio-2-selenopentyl)-1-thia-3-selenolanes, 2,6-bis(4,5-epithio-2-selenopentyl)-1,3,5-triselenane, bis(3,4-epithio-1-selenobutyl)tricycloselenaoctane, bis(3,4-epithio-1-selenobutyl)dicycloselenanonane, 2,3-, 2,4-, 2,5 and 3,4-bis(3,4-epithio-1-selenobutyl)selenophanes, 2,3-, 2,4-, 2,5- and 3,4-bis(4,5-epithio-2-selenopentyl)selenophanes, 2-(4,5-thioepoxy-2-selenopentyl)-5-(3,4-thioepoxy-1-selenobutyl)-1-selenacyclohexane, 2,3-, 2,4-, 2,5-, 2,6-, 3,4-, 3,5- and 4,5-bis(3,4-thioepoxy-1-selenobutyl)-1-selenacyclohexanes, 2,3-, 2,4-, 2,5-, 2,6-, 3,4-, 3,5- and 4,5-bis(4,5-thioepoxy-2-selenopentyl)-1-selenacyclohexanes, 2,3-, 2,5- and 2,6-bis(3,4-epithio-1-selenobutyl)-1,4-ditelluranes, 2,3-, 2,5- and 2,6-bis(4,5-epithio-2-selenopentyl)-1,4-ditelluranes, 2,4-, 2,5- and 5,6-bis(3,4-epithio-1-selenobutyl)-1,3-ditelluranes, 2,4-, 2,5- and 5,6-bis(4,5-epithio-2-selenopentyl)-1,3-ditelluranes, 2,3-, 2,5-, 2,6- and 3,5-bis(3,4-epithio-1-selenobutyl)-1-thia-4-telluranes, 2,3-, 2,5-, 2,6- and 3,5-bis(4,5-epithio-2-selenopentylthia-4-telluranes, 2,4- and 4,5-bis(3,4-epithio-1-selenobutyl)-1,3-ditellurolanes, 2,4- and 4,5-bis(4,5-epithio-2-selenopentyl)-1,3-ditellurolanes, 2,4-, 2,5- and 4,5-bis(3,4-epithio-1-selenobutyl)-1-thia-3-tellurolanes, 2,4-, 2,5- and 4,5-bis(4,5-epithio-2-selenopentyl)-1-thia-3-tellurolanes, 2,6-bis(4,5-epithio-2-selenopentyl)-1,3,5-tritellurane, bis(3,4-epithio-1-selenobutyl)tricyclotelluraoctane, bis(3,4-epithio-1-selenobutyl)dicyclotelluranonane, 2,3-, 2,4-, 2,5- and 3,4-bis(3,4-epithio-1-selenobutyl)tellurophanes, 2,3-, 2,4-, 2,5- and 3,4-bis(4,5-epithio-2-selenopentyl)tellurophanes, 2-(4,5-thioepoxy-2-selenopentyl)-5-(3,4-thioepoxy-1-selenobutyl-1-telluracyclohexane, 2,3-, 2,4-, 2,5-, 2,6-, 3,4-, 3,5- and 4,5-bis(3,4-thioepoxy-1-selenobutyl)-1-telluracyclohexanes and 2,3-, 2,4-, 2,5-, 2,6-, 3,4-, 3,5- and 4,5-bis(4,5-thioepoxy-2-selenopentyl)-1-telluracyclohexanes;

Compounds having an aromatic backbone structure such as 1,3- and 1,4-bis(β-epithiopropylseleno)benzenes, 1,3- and 1,4-bis(β-epithiopropylselenomethyl)benzenes, bis[4-(β-epithiopropylseleno)phenyl]methane, 2,2-bis[4-(β-epithiopropylseleno)phenyl]propane, bis[4-(β-epithiopropylseleno)phenyl]sulfide, bis[4-(β-epithiopropylseleno)phenyl]sulfone and 4,4'-bis(β-epithiopropylseleno)biphenyl; and Compounds obtained by replacing at least one hydrogen atom in the β-epithiopropyl group in the above compounds with methyl group.

Preferable examples of the organic compound having epithioalkyltelluro group of compound (E) include compounds obtained by replacing one or more epoxyalkyltelluro groups (specifically, β-epoxypropyltelluro groups) in epoxy compounds derived from an epihalohydrin and tellurium metal or a tellurium compound such as an alkali metal telluride, an alkali metal tellurol, an alkyl(aryl)tellurol and hydrogen telluride with epithioalkyltelluro groups. Specific examples of the above organic compound include:

Organic compounds having a chain aliphatic backbone structure such as bis(β-epithiopropyl)telluride, bis(β-epithiopropyl)ditelluride, bis(β-epithiopropyl)tritelluride, bis(β-epithiopropyltelluro)methane, 1,2-bis(β-epithiopropyltelluro)ethane, 1,3-bis(β-epithiopropyltelluro)propane, 1,2-bis(β-epithiopropyltelluro)propane, 1-(β-epithiopropyltelluro)-2-(β-epithiopropyltelluromethyl)propane, 1,4-bis(β-epithiopropyltelluro)butane, 1,3-bis(β-epithiopropyltelluro)butane, 1-(β-epithiopropyltelluro)-3-(β-epithiopropyltelluromethyl)butane, 1,5-bis(β-epithiopropyltelluro)pentane, 1-(β-epithiopropyltelluro)-4-

(β-epithiopropyltelluromethyl)pentane, 1,6-bis(β-epithiopropyltelluro)hexane, 1-(β-epithiopropyltelluro)-5-(β-epithiopropyltelluromethyl)hexane, 1-(β-epithiopropyltelluro)-2-[2-β-epithiopropyltelluroethyl)thiolethane, 1-(β-epithiopropyltelluro)-2-[[2-(2-β-epithiopropyltelluroethyl)telluroethyl]thio]ethane, tetrakis-(β-epithiopropyltelluromethyl)methane, 1,1,1-tris(β-epithiopropyltelluromethyl)propane, 1,5-bis(β-epithiopropyltelluro)-2-(β-epithiopropyltelluromethyl)-3-thiapentane, 1,5-bis(β-epithiopropyltelluro)-2,4-bis(β-epithiopropyltelluromethyl)-3-thiapentane, 1-(β-epithiopropyltelluro)-2,2-bis(β-epithiopropyltelluromethyl)-4-thiahexane, 1,5,6-tris(β-epithiopropyltelluro)-4-(β-epithiopropyltelluromethyl)-3-thiahexane, 1,8-bis(β-epithiopropyltelluro)-4-(β-epithiopropyltelluromethyl)-3,6-dithiaoctane, 1,8-bis(β-epithiopropyltelluro)-4,5-bis(β-epithiopropyltelluromethyl)-3,6-dithiaoctane, 1,8-bis(β-epithiopropyltelluro)-4,4-bis(β-epithiopropyltelluromethyl)-3,6-dithiaoctane, 1,8-bis(β-epithiopropyltelluro)-2,4,5-tris(β-epithiopropyltelluromethyl)-3,6-dithiaoctane, 1,8-bis(β-epithiopropyltelluro)-2,5-bis(β-epithiopropyltelluromethyl)-3,6-dithiaoctane, 1,9-bis(β-epithiopropyltelluro)-5-(β-epithiopropyltelluromethyl)-5-[(2-β-epithiopropyltelluroethyl)selenomethyl]-3,7-dithianonane, 1,10-bis(β-epithiopropyltelluro)-5,6-bis[(2-β-epithiopropyltelluroethyl)thio]-3,6,9-trithiadecane, 1,11-bis(β-epithiopropyltelluro)-4,8-bis(β-epithiopropyltelluromethyl)-3,6,9-trithiaundecane, 1,11-bis(β-epithiopropyltelluro)-5,7-bis(β-epithiopropyltelluromethyl)-3,6,9-trithiaundecane, 1,11-bis(β-epithiopropyltelluro)-5,7-[(2-β-epithiopropyltelluroethyl)selenomethyl]-3,6,9-trithiaundecane, 1,11-bis(β-epithiopropyltelluro)-4,7-bis(β-epithiopropyltelluromethyl)-3,6,9-trithiaundecane, tetra[2-(β-epithiopropyltelluro)acetylmethyl]methane, 1,1,1-tri[2-(β-epithiopropyltelluro)acetylmethyl]propane, tetra[2-β-epithiopropyltelluromethyl]acetylmethyl]methane, 1,1,1-tri[2-(β-epithiopropyltelluromethyl)acetylmethyl]propane, bis (5,6-epithio-3-tellurohexyl)selenide, 2,3-bis(6,7-thioepoxy-1-selena-4-telluroheptyl)-1-(3,4-thioepoxy-1-tellurobutyl)propane, 1,1,3,3-tetrakis(4,5-thioepoxy-2-telluropentyl)-2-selenapropane, bis(4,5-thioepoxy-2-telluropentyl)-3,6,9-triselenaundecane-1,11-bis(3,4-thioepoxy-1-tellurobutyl), 1,4-bis(3,4-thioepoxy-1-tellurobutyl)-2,3-bis(6,7-thioepoxy-1-selena-4-telluroheptyl)butane, tris(4,5-thioepoxy-2-telluropentyl)-3-selena-6-thiaoctane-1,8-bis(3,4-thioepoxy-1-tellurobutyl), bis(5,6-epithio-3-tellurohexyl)telluride, 2,3-bis(6,7-thioepoxy-1-tellura-4-telluroheptyl)-1-(3,4-thioepoxy-1-tellurobutyl)propane, 1,1,3,3-tetrakis(4,5-thioepoxy-2-telluropentyl)-2-tellurapropane, bis(4,5-thioepoxy-2-telluropentyl)-3,6,9-tritelluraundecane-1,1,1-bis(3,4-thioepoxy-1-tellurobutyl), 1,4-bis(3,4-thioepoxy-1-tellurobutyl)-2,3-bis(6,7-thioepoxy-1-tellura-4-telluroheptyl)butane and tris(4,5-thioepoxy-2-telluropentyl)-3-tellura-6-thiaoctane-1,8-bis(3,4-thioepoxy-1-tellurobutyl);

Compounds having an alicyclic backbone structure such as 1,3- and 1,4-bis(β-epithiopropyltelluro)cyclohexanes, 1,3- and 1,4-bis(β-epithiopropyltelluromethyl)cyclohexanes, bis[4-(β-epithiopropyltelluro)cyclohexyl]methane, 2,2-bis[4-(β-epithiopropyltelluro)cyclohexyl]propane, bis[4-(β-epithiopropyltelluro)cyclohexyl]sulfide, 2,5-bis(β-epithiopropyltelluromethyl)-1,4-dithiane, 2,5-bis(β-epithiopropyltelluroethyl thiomethyl)-1,4-dithiane; 2,3-, 2,5- and 2,6-bis(3,4-epithio-1-tellurobutyl)-1,4-diselenanes, 2,3-, 2,5- and 2,6-bis(4,5-epithio-2-telluropentyl)-1,4-diselenanes, 2,4-, 2,5- and 5,6-bis(3,4-epithio-1-tellurobutyl)-1,3-diselenanes, 2,4-, 2,5- and 5,6-bis(4,5-epithio-2-telluropentyl)-1,3-diselenanes, 2,3-, 2,5-, 2,6- and 3,5-bis(3,4-epithio-1-tellurobutyl)-1-thia-4-selenanes, 2,3-, 2,5-, 2,6- and 3,5-bis(4,5-epithio-2-telluropentyl)-1-thia-4-selenanes, 2,4- and 4,5-bis(3,4-epithio-1-tellurobutyl)-1,3-diselenolanes, 2,4- and 4,5-bis(4,5-epithio-2-telluropentyl)-1,3-diselenolanes, 2,4-, 2,5- and 4,5-bis(3,4-epithio-1-tellurobutyl)-1-thia-3-selenolanes, 2,4-, 2,5- and 4,5-bis(4,5-epithio-2-telluropentyl)-1-thia-3-selenolanes, 2,6-bis(4,5-epithio-2-telluropentyl-1,3,5-triselenane, bis(3,4-epithio-1-tellurobutyl)tricycloselenaoctane, bis(3,4-epithio-1-tellurobutyl)dicycloselenanonane, 2,3-, 2,4-, 2,5 and 3,4-bis(3,4-epithio-1-tellurobutyl)selenophanes, 2,3-, 2,4-, 2,5- and 3,4-bis(4,5-epithio-2-telluropentyl)selenophanes, 2-(4,5-thioepoxy-2-telluropentyl)-5-(3,4-thioepoxy-1-tellurobutyl)-1-selenacyclohexane, 2,3-, 2,4-, 2,5-, 2,6-, 3,4-, 3,5- and 4,5-bis(3,4-thioepoxy-1-tellurobutyl)-1-selenacyclohexanes, 2,3-, 2,4-, 2,5-, 2,6-, 3,4-, 3,5- and 4,5-bis(4,5-thioepoxy-2-telluropentyl)-1-selenacyclohexanes, 2,3-, 2,5- and 2,6-bis(3,4-epithio-1-tellurobutyl)-1,4-ditelluranes, 2,3-, 2,5- and 2,6-bis(4,5-epithio-2-telluropentyl)-1,4-ditelluranes, 2,4-, 2,5- and 5,6-bis(3,4-epithio-1-tellurobutyl)-1,3-ditelluranes, 2,4-, 2,5- and 5,6-bis(4,5-epithio-2-telluropentyl)-1,3-ditelluranes, 2,3-, 2,5-, 2,6- and 3,5-bis(3,4-epithio-1-tellurobutyl)-1-thia-4-telluranes, 2,3-, 2,5-, 2,6- and 3,5-bis(4,5-epithio-2-telluropentyl)-1-thia-4-telluranes, 2,4- and 4,5-bis(3,4-epithio-1-tellurobutyl)-1,3-ditellurolanes, 2,4- and 4,5-bis(4,5-epithio-2-telluropentyl)1,3-ditellurolanes, 2,4-, 2,5- and 4,5-bis(3,4-epithio-1-tellurobutyl)-1-thia-3-tellurolanes, 2,4-, 2,5- and 4,5-bis(4,5-epithio-2-telluropentyl)-1-thia-3-tellurolanes, 2,6-bis(4,5-epithio-2-telluropentyl)-1,3,5-tritellurane, bis(3,4-epithio-1-tellurobutyl)tricyclotelluraoctane, bis(3,4-epithio-1-tellurobutyl)dicyclotelluranonane, 2,3-, 2,4-, 2,5- and 3,4-bis(3,4-epithio-1-tellurobutyl)tellurophanes, 2,3-, 2,4-, 2,5- and 3,4-bis(4,5-epithio-2-telluropentyl)tellurophanes, 2-(4,5-thioepoxy-2-telluropentyl)-5-(3,4-thioepoxy-1-tellurobutyl)-1-telluracyclohexane, 2,3-, 2,4-, 2,5-, 2,6-, 3,4-, 3,5- and 4,5-bis(3,4-thioepoxy-1-tellurobutyl)-1-telluracyclohexanes and 2,3-, 2,4-, 2,5-, 2,6-, 3,4-, 3,5- and 4,5-bis(4,5-thioepoxy-2-telluropentyl)-1-telluracyclohexanes;

Compounds having an aromatic backbone structure such as 1,3- and 1,4-bis(β-epithiopropyltelluro)benzenes, 1,3- and 1,4-bis(β-epithiopropyltelluromethyl)benzenes, bis[4-(β-epithiopropyltelluro)phenyl]methane, 2,2-bis[4-(β-epithiopropyltelluro)phenyl]propane, bis[4-(β-epithiopropyltelluro)phenyl]sulfide, bis[4-(β-epithiopropyltelluro)phenyl]sulfone and 4,4'-bis(β-epithiopropyltelluro)biphenyl; and Compounds obtained by replacing at least one hydrogen atom in the β-epithiopropyl group in the above compounds with methyl group.

Further examples of compounds (A) to (E) include organic compounds having unsaturated groups. Specific examples of such compounds include vinylphenyl thioglycidyl ether, vinylbenzyl thioglycidyl ether, thioglycidyl methacrylate, thioglycidyl acrylate and allyl thioglycidyl ether.

Further examples of the compounds having one epithio group include compounds such as ethylene sulfide, propylene sulfide and thioglycidol; thioglycidyl esters of monocarboxylic acids such as acetic acid, propionic acid and benzoic acid; and thioglycidyl ethers such as methyl thioglycidyl ether, ethyl thioglycidyl ether, propyl thioglycidyl ether and butyl thioglycidyl ether.

Among the above compounds, the organic compounds having epithioalkyloxy groups of compound (B), the organic compounds having epithioalkylthio groups of compound (C), the organic compounds having epithioalkylseleno groups of compound (D) and the organic compounds having epithioalkyltelluro groups of compound (E) are preferable. The compounds having epithioalkylthio groups of compound (C) and the compounds having epithioalkylseleno groups of compound (D) are more preferable.

Examples of still more preferable compounds include chain compounds, branched compounds, alicyclic compounds and aromatic compounds having β-epithiopropylthio groups or (β-epithiopropylseleno groups which are described above as the examples. Most preferable compounds among these compounds are compounds represented by the following formula (2):

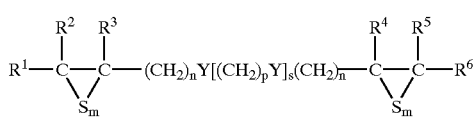
(2)

wherein $R^1$ to $R^6$ each represents hydrogen atom or a hydrocarbon group having 1 to 10 carbon atoms, Y represents O, S, Se or Te, p represents a number of 1 to 6, s represents a number of 0 to 4, m represents a number of 1 to 5 and n represents 0 or 1.

In the process for producing an episulfide compound from an epoxy compound, when a salt of thiocyanic acid is used as the agent for producing a thia compound, it is preferable that an alkali metal salt or an alkaline earth metal salt of thiocyanic acid and more preferably potassium salt, sodium salt or ammonium salt of thiocyanic acid is used as the salt of thiocyanic acid. The salt of thiocyanic acid or thiourea as the agent for producing a thia compound is used in a stoichiometric amount by mol with respect to the amount by mol of the epoxy group. However, the amount may be more or less than this amount when purity of the product, the reaction rate or economy is emphasized. It is preferable that the reaction is conducted by using the salt of thiocyanic acid or thiourea in an amount by mol in the range of the stoichiometric amount to the amount 5 times as much as the stoichiometric amount and more preferably in an amount by mol in the range of the stoichiometric amount to the amount 2.5 times as much as the stoichiometric amount. The reaction may be conducted in a solvent or without any solvents. When a solvent is used, it is preferable that a solvent which dissolves the salt of thiocyanic acid, thiourea or the epoxy compound is used.

Examples of the solvent include inorganic solvents such as water and organic solvents. Examples of the organic solvent include alcohols such as methanol and ethanol, ethers such as diethyl ether, tetrahydrofuran and dioxane, hydroxyethers such as methylcellosolve, ethylcellosolve and butylcellosolve, aromatic hydrocarbons such as benzene, toluene and xylene and halogenated hydrocarbons such as dichloroethane, chloroform and chlorobenzene. A combination of these solvents such a combination of an alcohol with water and a combination of an ether, a hydroxyether, a halogenated hydrocarbon or an aromatic hydrocarbon with an alcohol is occasionally effective.

To obtain an excellent result of the reaction, it is effective that an acid or an acid anhydride is added into the reaction solution as the polymerization inhibitor. The polymerization inhibitor is generally added in an amount in the range of 0.001 to 10% by weight and preferably 0.01 to 1% by weight of the total amount of the reaction solution. The reaction is conducted generally at a temperature of 0 to 100° C. and preferably 10 to 70° C. The reaction time is not particularly limited as long as the reaction is completed under the above conditions. It is generally suitable that the reaction time is 20 hours or shorter. It is possible that stability of the compound obtained by the reaction is enhanced by washing the reaction product with an acidic aqueous solution. In the washing, the mixture may be stirred or a non-aqueous solution may be added, where necessary. The acidic aqueous solution is generally effective at a pH of 6 or lower and more effective at a pH in the range of 3 to 0.

When an aqueous system is used as the reaction solvent, the episulfide compound is extracted with an extracting solvent (a non-aqueous solvent) from the reaction solution. To further purify the monomer, it is effective that the obtained extract containing the episulfide compound is washed with water.

As another process for producing the episulfide compound, an unsaturated compound represented by formula (3) is oxidized with an organic peracid, an alkyl hydroperoxide or hydrogen peroxide to prepare an epoxy compound and the prepared epoxy compound is converted into a thia compound in accordance with the above method to obtain a compound represented by formula (1), formula (3) being:

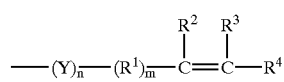
(3)

wherein $R^1$ represents a hydrocarbon group having 1 to 10 carbon atoms, $R^2$, $R^3$ and $R^4$ each represents hydrogen atom or a hydrocarbon group having 1 to 10 carbon atoms, Y represents O, S, Se or Te, n represents 0 or 1 and m represents 0 or 1.

As still another process for producing the episulfide compound, it is effective that the episulfide is prepared in accordance with the dehalogenation reaction from a halomercaptan having the structure represented by the following formula (4):

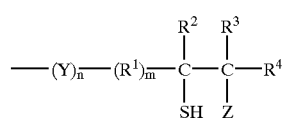
(4)

wherein $R^1$ represents a hydrocarbon group having 1 to 10 carbon atoms, $R^2$, $R^3$ and $R^4$ each represents hydrogen atom or a hydrocarbon group having 1 to 10 carbon atoms, Y represents O, S, Se or Te, n represents 0 or 1, m represents 0 or 1 and Z represents a halogen atom.

It is known that the halomercaptan can be synthesized easily from the unsaturated compounds described above and a sulfur chloride compound (for example, F. Lautenschlaerger et al. J. Org. Chem., 34, 396 (1969)).

In the present invention, the inorganic compound is as defined in "Hyojun Kagaku Yogo Jiten (Standard Dictionary of Chemical Terms)" (Edited by Chemical Society of Japan, 1991; Published by MARUZEN Co., Ltd.). In the present invention, as described in this reference, an inorganic compounds is defined as a compound which does not contain carbon or a relatively simple compound which contains carbon. In accordance with this definition, relatively simple compounds which contains carbon such as carbon disulfide and potassium thiocyanate are regarded as inorganic compounds.

As the inorganic compound containing sulfur atom used in the present invention, any compound satisfying this condition can be used. Examples of the inorganic compound containing sulfur atom include sulfur, hydrogen sulfide, carbon disulfide, ammonium sulfide, oxides of sulfur such as sulfur dioxide and sulfur trioxide, salts of thiocarbonic acid, sulfuric acid, salts of sulfuric acid, salts of hydrogensulfuric acid, salts of sulfurous acid, salts of hyposulfurous acid, salts of persulfuric acid, salts of thiocyanic acid, salts of thiosulfuric acid, sulfur dichloride, halides such as thionyl chloride and thiophosgen, boron sulfide, nitrogen sulfide, silicon sulfide, phosphorus sulfide, arsenic sulfide, metal sulfides and metal hydrogensulfides. Among these compounds, sulfur, carbon disulfide, phosphorus sulfide, metal sulfides and metal hydrogensulfides are preferable and sulfur and carbon disulfide are more preferable.

As the compound containing selenium atom used in the present invention, any compound satisfying this condition can be used. Examples of the compound containing selenium atom include selenium, hydrogen selenide, selenium dioxide, carbon diselenide, carbon selenosulfide, ammonium selenide, oxides of selenium such as selenium dioxide, selenic acid, salts of selenic acid, selenous acid, salts of selenous acid, salts of hydrogenselenic acid, selenosulfuric acid, salts of selenosulfuric acid, selenopyrosulfuric acid, salts of selenopyrosulfuric acid, halides such as selenium tetrabromide and selenium oxychloride, salts of selenocyanic acid, boron selenide, phosphorus selenide, arsenic selenide and metal selenides. Among these compounds, selenium, carbon selenide, carbon selenosulfide, phosphorus selenide and metal selenides are preferable and selenium and lead selenide are more preferable.

In the present invention, examples of the compound containing sulfur atom and selenium atom include selenium sulfide and selenide of carbon sulfide. Selenium sulfide is preferable among these compounds.

In the preparation of the optical material of the present invention, a curing catalyst may be used, where necessary. Examples of the curing catalyst used for producing an optical material in accordance with the process of the present invention include amines, phosphines, quaternary ammonium salts, quaternary phosphonium salts, tertiary sulfonium salts, secondary iodonium salts, mineral acids, Lewis acids, organic acids, silicic acids and tetrafluoroboric acid. Specific examples of the curing catalysts are as follows:

(1) Primary monoamines such as ethylamine, n-propylamine, sec-propylamine, n-butylamine, sec-butylamine, isobutylamine, tert-butylamine, pentylamine, hexylamine, heptylamine, octylamine, decylamine, laurylamine, myristylamine, 1,2-dimethylhexylamine, 3-pentylamine, 2-ethylhexylamine, allylamine, aminoethanol, 1-aminopropanol, 2-aminopropanol, aminobutanol, aminopentanol, aminohexanol, 3-ethoxypropylamine, 3-propoxypropylamine, 3-isopropoxypropylamine, 3-butoxypropylamine, 3-isobutoxypropylamine, 3-(2-ethylhexyloxy)propylamine, aminocyclopentane, aminocyclohexane, aminonorbornene, aminomethylcyclohexane, aminobenzene, benzylamine, phenetylamine, α-phenylethylamine, naphthylamine and furfurylamine; primary polyamines such as ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, 1,7-diaminoheptane, 1,8-diaminooctane, dimethylaminopropylamine, diethylaminopropylamine, bis-(3-aminopropyl)ether, 1,2-bis-(3-aminopropoxy)ethane, 1,3-bis-(3-aminopropoxy)-2,2'-dimethylpropane, aminoethylethanolamine, 1,2-, 1,3- and 1,4-bisaminocyclohexanes, 1,3- and 1,4-bisaminomethylcyclohexanes, 1,3- and 1,4-bisaminoethylcyclohexanes, 1,3- and 1,4-bisaminopropylcyclohexanes, hydrogenated 4,4'-diaminodiphenylmethane, 2- and 4-aminopiperidines, 2- and 4-aminomethylpiperidines, 2- and 4-aminoethylpiperidines, N-aminoethylpiperidine, N-aminopropylpiperidine, N-aminoethylmorpholine, N-aminopropylmorpholine, isophoronediamine, menthanediamine, 1,4-bisaminopropylpiperadine, o-, m- and p-phenylenediamines, 2,4- and 2,6-tolylenediamines, 2,4-toluenediamine, m-aminobenzylamine, 4-chloro-o-phenylenediamine, tetrachloro-p-xylylenediamine, 4-methoxy-6-methyl-m-phenylenediamine, m- and p-xylylenediamines, 1,5- and 2,6-naphthalenediamines, benzidine, 4,4'-bis(o-toluidine), dianisidine, 4,4'-diaminodiphenylmethane, 2,2-(4,4'-diaminodiphenyl)propane, 4,4'-diaminodiphenyl ether, 4,4'-thiodianiline, 4,4'-diaminodiphenyl sulfone, 4,4'-diaminoditolyl sulfone, methylenebis(o-chloroaniline), 3,9-bis(3-aminopropyl)-2,4,8,10-tetraoxaspiro[5,5]undecane, diethylenetriamine, iminobispropylamine, methyliminobispropylamine, bis(hexamethylene)triamine, triethylenetetramine, tetraethylenepentamine, pentaethylenehexamine, N-aminoethylpiperadine, N-aminopropylpiperadine, 1,4-bis(aminoethylpiperadine), 1,4-bis(aminopropylpiperadine), 2,6-diaminopyridine and bis(3,4-diaminophenyl)sulfone; secondary monoamines such as diethylamine, dipropylamine, di-n-butylamine, di-sec-butylamine, diisobutylamine, di-n-pentylamine, di-3-pentylamine, dihexylamine, dioctylamine, di(2-ethylhexyl)amine, methylhexylamine, diallylamine, pyrrolidine, piperidine, 2-, 3- and 4-picolines, 2,4-, 2,6- and 3,5-lupetidines, diphenylamine, N-methylaniline, N-ethylaniline, dibenzylamine, methylbenzylamine, dinaphthylamine, pyrrol, indoline, indole and morpholine; secondary polyamines such as N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,6-diaminohexane, piperadine, 2-methylpiperadine, 2,5- and 2,6-dimethylpiperadines, homopiperadine, 1,1-di(4-piperidyl)methane, 1,2-di(4-piperidyl)ethane, 1,3-di(4-piperidyl)propane, 1,4-di(4-piperidyl)butane and tetramethylguanidine; tertiary amines such as trimethylamine, triethylamine, tri-n-propylamine, triisopropylamine, tri-1,2-dimethylpropylamine, tri-3-methoxypropyl amine, tri-n-butylamine, triisobutylamine, tri-sec-butylamine, tri-n-pentylamine, tri-3-pentylamine, tri-n-hexylamine, tri-n-octylamine, tri-2-ethylhexylamine, tridodecylamine, trilaurylamine, dicyclohexylethylamine, cyclohexyldiethylamine, tricyclohexylamine, N,N-dimethylhexylamine, N-methyldihexylamine, N,N-dimethylcyclohexylamine, N-methyldicyclohexylamine, N,N-diethylethanolamine, N,N-dimethylethanolamine, N-ethyldiethanolamine, triethanolamine, tribenzylamine, N,N-dimethylbenzylamine, diethylbenzylamine, triphenylamine, N,N-dimethylamino-p-cresol, N,N-dimethylaminomethylphenol, 2-(N,N-dimethylaminomethyl)phenol, N,N-dimethylaniline, N,N-diethylaniline, pyridine, quinoline, N-methylmorpholine, N-methylpiperidine and 2-(2-dimethylaminoethoxy)-4-methyl-1,3,2-dioxabornane; tertiary polyamines such as tetramethylethylenediamine, pyrazine, N,N'-dimethylpiperadine, N,N'-bis((2-hydroxy)propyl) piperadine, hexamethylenetetramine, N,N,N',N'-tetramethyl-1,3-butaneamine, 2-dimethylamino-2-hydroxypropane, diethyaminoethanol, N,N,N-tris(3-dimethylaminopropyl)amine, 2,4,6-tris(N,N,N-dimethylaminomethyl)phenol and heptamethylisobiguanide; imidazoles such as imidazole, N-methylimidazole, 2-methylimidazole, 4-methylimidazole, N-ethylimidazole, 2-ethylimidazole, 4-ethylimidazole, N-butylimidazole, 2-butylimidazole, N-undecylimidazole, 2-undecylimidazole, N-phenylimidazole, 2-phenylimidazole, N-benzylimidazole, 2-benzylimidazole, 1-benzyl-2-methylimidazole, N-(2'-cyanoethyl)-2-methylimidazole, N-(2'-cycanoethyl)-2-undecylimidazole, N-(2'-cyanoethyl)-2-phenylimidazole, 3,3-bis-(2-ethyl-4-methylimidazolyl) methane, 2-mercaptoimidazole, 2-mercapto-N-methylimidazole, 2-mercaptobenzoimidazole, 3-mercapto-4-methyl-4H-1,2,4-triazole, 5-mercapto-1-methyltetrazole, 2,5-domercapto-1,3,4-thiadiazole, addition products of alkylimidazoles and isocyanuric acid and condensation products of alkylimidazoles and formaldehyde; and amidines such as 1,8-diazabicyclo-(5,4,0)undecene-7,1,5-diazabicyclo(4,3,0)nonene-5,6-dibutylamino-1,8-diazabicyclo(5,4,0)-undecene-7.

(2) Salts of the amines described above in (1) with borane or boron trifluoride.

(3) Phosphines such as trimethylphosphine, triethylphosphine, triisopropylphosphine, tri-n-butylphosphine, tri-n-hexylphosphine, tri-n-octylphosphine, tricyclohexylphosphine, triphenylphosphine, tribenzylphosphine, tris(2-methylphenyl)phosphine, tris(3-methylphenyl)phosphine, tris(4-methylphenyl)phosphine, tris-(diethylamino)phosphine, tris(4-methylphenyl) phosphine, dimethylphenylphosphine, diethylphenylphosphine, dicyclohexyolphenylphosphine, ethyldiphenylphosphine, diphenylcyclohexylphosphine and chlorodiphenylphosphine;

(4) Quaternary ammonium salts such as tetramethylammonium chloride, tetramethylammonium bromide, tetramethylammonium acetate, tetraethylammonium chloride, tetraethylammonium bromide, tetraethylammonium acetate, tetra-n-butylammonium fluoride, tetra-n-butylammonium chloride, tetra-n-butylammonium bromide, tetra-n-butylammonium iodide, tetra-n-butylammonium acetate, tetra-n-butylammonium borohydride, tetra-n-butylammonium hexafluorophosphite, tetra-n-butylammonium hydrogensulfite, tetra-n-butylammonium tetrafluoroborate, tetra-n-butylammonium tetraphenylborate, tetra-n-butylammonium para-toluenesulfonate, tetra-n-hexylammonium chloride, tetra-n-hexylammonium bromide, tetra-n-hexylammonium acetate, tetra-n-octylammonium chloride, tetra-n-octylammonium bromide, tetra-n-octylammonium acetate, trimethyl-n-octylammonium chloride, trimethylbenzylammonium chloride, trimethylbenzylammonium bromide, triethyl-n-octylammonium chloride, triethylbenzylammonium chloride, triethylbenzylammonium bromide, tri-n-butyl-n-octylammonium chloride, tri-n-butylbenzylammonium fluoride, tri-n-butylbenzylammonium chloride, tri-n-butylbenzylammonium bromide, tri-n-butylbenzylammonium iodide, methyltriphenylammonium chloride, methyltriphenylammonium bromide, ethyltriphenylammonium chloride, ethyltriphenylammonium bromide, n-butyltriphenylammonium chloride, n-butyltriphenylammonium bromide, 1-menthylpyridinium bromide, 1-ethylpyridinium bromide, 1-n-butylpyridinium bromide, 1-n-hexylpyridinium bromide, 1-n-octylpyridinium bromide, 1-n-dodecylpyridinium bromide, 1-n-phenylpyridinium bromide, 1-methylpicolinium bromide, 1-ethylpicolinium bromide, 1-n-butylpicolinium bromide, 1-n-hexylpicolinium bromide, 1-n-octylpicolinium bromide, 1-n-dodecylpicolinium bromide and 1-phenylpicolinium bromide.

(5) Quaternary phosphonium salts such as tetramethylphosphonium chloride, tetramethylphosphonium bromide, tetraethylphosphonium chloride, tetraethylphosphonium bromide, tetra-n-butylphosphonium chloride, tetra-n-butylphosphonium bromide, tetra-n-butylphosphonium iodide, tetra-n-hexylphosphonium bromide, tetra-n-octylphosphonium bromide, methyltriphenylphosphonium bromide, methyltriphenylphosphonium iodide, ethyltriphenylphosphonium bromide, ethyltriphenylphosphonium iodide, n-butyltriphenylphosphonium bromide, n-butyltriphenylphosphonium iodide, n-hexyltriphenylphosphonium bromide, n-octyltriphenylphosphonium bromide, tetraphenylphosphonium bromide, tetrakishydroxymethylphosphonium chloride, tetrakishydroxy-methylphosphonium bromide, tetrakishydroxyethylphosphonium chloride and tetrakishydroxybutylphosphonium chloride.

(6) Tertiary sulfonium salts such as trimethylsulfonium bromide, tnethylsulfonium bromide, tri-n-butylsulfonium chloride, tri-n-butylsulfonium bromide, tri-n-butylsulfonium iodide, tri-n-butylsulfonium tetrafluoroborate, tri-n-hexylsulfonium bromide, tri-n-octylsulfonium bromide, triphenylsulfonium chloride, triphenylsulfonium bromide and triphenylsulfonium iodide.

(7) Secondary iodonium salts such as diphenyliodonium chloride, diphenyliodonium bromide and diphenyliodonium iodide.

(8) Mineral acids such as hydrochloric acid, sulfuric acid, nitric acid, phosphoric acid and carbonic acid. Half-esters of these mineral acids can also be used.

(9) Lewis acids such as boron trifluoride and boron trifluoride etherates.

(10) Organic acids and half-esters of organic acids.

(11) Silicic acids and tetrafluoroboric acid.

The above compounds may be used as the curing catalyst singly or in combination of two or more.

The amount of the curing catalyst used in the present invention is 0.001 to 10.0 parts by weight and preferably 0.005 to 5.0 parts by weight per 100 parts by weight of the composition which comprises a mixture of the compound having one or more structures represented by formula (1) in one molecule and one or more inorganic compounds comprising at least one atom of sulfur atom and selenium atom.

To the composition of the present invention, a compound having one or more functional groups reactive with the β-epi(poly)thioalkyl group in formula (1), a compound having one or more functional groups reactive with the β-epi(poly)thioalkyl group in formula (1) and one or more other homopolymerizable groups, a compound having one or more homopolymerizable groups or a compound having one homopolymerizable group which is reactive with the β-epi(poly)thioalkyl group may be added and the prepared composition may be cured by polymerization. Specific examples of these compounds include the corresponding compounds described as the examples in the specification of Japanese Patent Application Laid-Open No. Heisei 9(1997)-255781.

It is preferable that a radical polymerization initiator is used to promote the polymerization when a compound having an unsaturated group is used. As the radical polymerization initiator, any compound which generates radical by heating or by irradiation of ultraviolet light or electron beams can be used. Specific examples of the radical polymerization initiator include the corresponding compounds described as the examples in the specification of Japanese Patent Application Laid-Open No. Heisei 9(1997)-255781.

It is possible that a compound having one or more SH groups is added to the composition of the present invention as the antioxidation component alone or in combination with conventional antioxidants to further improve oxidation resistance of the cured product. Examples of the compound having one or more SH groups include mercaptans and thiophenols. Further examples include mercaptans and thiophenols having unsaturated groups such as vinyl group, aromatic vinyl groups, methacryl group, acryl group and allyl group. Specific examples of the compound having one or more SH groups include the corresponding compounds described as the examples in the specification of Japanese Patent Application Laid-Open No. Heisei 9(1997)-255781.

It is also possible that a compound having one or more active hydrogen atoms other than that of SH group is used to improve the properties such as the tint performance and strength. Examples of the active hydrogen atom include hydrogen atoms in hydroxyl group, carboxyl group and amide group and hydrogen atoms at the 2-position of 1,3-diketones, 1,3-dicarboxylic acids, esters of 1,3-dicarboxylic acids, 3-ketocarboxylic acids and esters of 3-ketocarboxylic acids. Examples of the compound having one or more active hydrogen atoms in one molecule include alcohols, phenols, mercaptoalcohols, hydroxythiophenols, carboxylic acids, mercaptocarboxylic acids, hydroxycarboxylic acids, amides, 1,3-diketones, 1,3-dicarboxylic acids, esters of 1,3-dicarboxylic acids, 3-ketocarboxylic acids, esters of 3-ketocarboxylic acids and compounds having unsaturated groups such as alcohols, phenols, mercaptoalcohols, hydroxythiophenols, carboxylic acids, mercapto carboxylic acids, hydroxycarboxylic acids, amides, 1,3-diketones, 1,3-dicarboxylic acids, esters of 1,3-dicarboxylic acids, 3-ketocarboxylic acids and esters of 3-ketocarboxylic acids having vinyl group, aromatic vinyl groups, methacryl group, acryl group and allyl group. Specific examples of the compound having one or more active hydrogen atoms other than that of SH group include the corresponding compounds described as the examples in the specification of Japanese Patent Application Laid-Open No. Heisei 9(1997)-255781.

It is also possible that a compound having one or more isocyanate groups is used to improve strength. Specific examples of the compound having one or more isocyanate groups include the corresponding compounds described as the examples in the specification of Japanese Patent Application Laid-Open No. Heisei 10(1997)-028481.

The amounts of the above agents used for improving the properties are decided in the range in which no adverse effects are found on the optical properties or the mechanical properties and cannot be generally defined. It is preferable that the amounts are 90% by weight or less.

In the present invention, in the composition which comprises a mixture of the compound having one or more structures represented by formula (1) in one molecule and one or more inorganic compounds comprising at least one atom of sulfur atom and selenium atom, the compound having one or more structures represented by formula (1) in one molecule is used in an amount of 10% by weight or more, preferably 20% by weight or more and more preferably 30% by weight or more. When the amount is less than 10% by weight, the balance between the large refractive index and the large Abbe number cannot be maintained.

In the present invention, in the composition which comprises a mixture of a compound having one or more structures represented by formula (1) in one molecule and one or more inorganic compounds comprising at least one atom of sulfur atom and selenium atom, the inorganic compounds comprising at least one atom of sulfur atom and selenium atom are used in an amount of 1% by weight or more, preferably 2% by weight or more and more preferably 3% by weight or more. When the amount is less than 1% by weight, almost no improvement in the refractive index can be found.

As for the relative amounts of the compound having one or more structures represented by formula (1) in one molecule and the inorganic compounds comprising at least one atom of sulfur atom and selenium atom, the inorganic compounds comprising at least one atom of sulfur atom and selenium atom are used in an amount of 1 to 50 parts by weight and preferably 1 to 30 parts by weight per 100 parts by weight of the compound having one or more structures represented by formula (1) in one molecule.

In the process for producing the optical material of the present invention, it is, of course, possible that conventional antioxidants and ultraviolet light absorbents are added to further improve the practical properties of the resin. The optical material produced in accordance with the process of the present invention tends to be cleaved from molds during polymerization. Therefore, it is effective that conventional external and/or internal adhesion improvers are used or added to control and improve adhesion between the obtained optical material and the mold.

In the process for producing the optical material in the present invention, the composition (main material) which comprises a mixture of the compound having one or more structures represented by formula (1) in one molecule and one or more inorganic compounds comprising at least one atom of sulfur atom and selenium atom is mixed with various additives (auxiliary materials) such as catalysts, adhesion improvers, antioxidants, ultraviolet light absorbents, radical polymerization initiators and various agents for improving properties and a homogeneous mixture is formed. The prepared mixture is cast into a mold made of glass or a metal, heated to allow the polymerization to proceed and removed from the mold and an optical material is produced.

It is possible that, before the above mixture is prepared and cast into a mold, a preliminary polymerization of the entire amount or portions of the composition which comprises a mixture of the compound having one or more structures represented by formula (1) in one molecule and one or more inorganic compounds comprising at least one atom of sulfur atom and selenium atom is conducted at −100 to 160° C. for 0.1 to 72 hours in the presence or in the absence of a catalyst while being stirred or not stirred and then a composition for an optical material is prepared using the preliminarily polymerized composition and cast into a mold. The preliminary polymerization is conducted preferably in the condition of −10 to 100° C. and 1 to 48 hours and more preferably of 0 to 60° C. and 1 to 48 hours.

The process for producing the optical material of the present invention is described more specifically in the following. The main material and the auxiliary materials are mixed together as described above and the obtained mixture is cast into a mold and cured. The composition which comprises a mixture of a compound having one or more structures represented by formula (1) in one molecule and one or more inorganic compounds comprising at least one atom of sulfur atom and selenium atom, the catalyst, the component used where desired, i.e., the compound having two or more functional groups reactive with the β-epi(poly)thio group, the compound having one or more functional groups reactive with the epithio group and one or more homopolymerizable functional groups, the compound having one or more homopolymerizable groups or the compound having one homopolymerizable functional group which is reactive with the β-epi(poly)thio group, and other additives such as antioxidants, components for improving the tint performance and strength, adhesion improvers, stabilizers and radical polymerization initiators may be mixed together in one vessel at the same time in the entire amounts. Alternatively, the components may be added stepwise. Some components may also be mixed together separately in advance and the obtained mixtures may be mixed with other components in one vessel. The materials and auxiliary materials used may be mixed together in any desired order. The temperature and the time of mixing are not limited as long as the components can be sufficiently mixed together. However, an excessively high temperature and an excessively long time are not preferable because undesirable reactions take place between the components, viscosity increases and the operation of casting becomes difficult. The temperature of mixing should be in the range of about −50 to 100° C., preferably in the range of −30 to 50° C. and more preferably in the range of −5 to 30° C. The time of mixing is in the range of 1 minute to 5 hours, preferably in the range of 5 minutes to 2 hours, more preferably in the range of 5 to 30 minutes and most preferably in the range of about 5 to 15 minutes. It is preferable that degassing under vacuum is conducted before, during or after mixing the materials and the additives to prevent formation of bubbles during casting and curing in the mold. The pressure of the degassing is about 0.1 to 700 mmHg and preferably about 10 to 300 mmHg. To obtain a better quality of the optical materials in the present invention, it is preferable that impurities are removed before the casting from the main material and the auxiliary materials by filtration using a filter having a pore diameter of 0.05 to 3 μm. After the mixture is cast into the mold made of glass or a metal, the curing by polymerization is conducted in an electric oven or the like. The curing time is 0.1 to 100 hours and generally 1 to 48 hours. The curing temperature is −10 to 160° C. and generally −10 to 140° C. The polymerization can be conducted by the steps of holding the temperature at a specific polymerization temperature for a specific period of time, raising the temperature at a speed of 0.1 to 100° C./hour and lowering the temperature at a speed of 0.1 to 100° C./hour or a combination of these steps. It is preferable that the material obtained after the curing is annealed at a temperature of 50 to 150° C. for about 10 minutes to 5 hours to remove strains from the prepared optical material of the present invention. Where necessary, the prepared material may have surface treatments such as treatments of tinting, formation of hard coat, prevention of reflection and prevention of clouding of the material.

To summarize the advantages obtained by the present invention, by using the composition for optical materials which comprises a mixture of a compound having one or more structures represented by formula (1) in one molecule and one or more inorganic compounds comprising at least one atom of sulfur atom and selenium atom, it is enabled that a large Abbe number and a refractive index exceeding those of conventional materials, i.e., a refractive index of 1.72 or larger, are exhibited simultaneously.

EXAMPLES

The present invention will be described more specifically with reference to examples in the following. However, the present invention is not limited to the examples. The properties of the obtained lenses were evaluated in accordance with the following method.

Refractive Index and Abbe Number (ND and vD)

The refractive index and the Abbe number were measured at 25° C. using an Abbe refractometer.

Example 1

With 100 parts by weight of a mixture containing 90 parts by weight of 1,2-bis(β-epithiopropylthio)ethane and 10 parts by weight of sulfur, 0.1 parts by weight of tetrabromophosphonium bromide as the catalyst was mixed and a homogeneous solution was prepared. The prepared solution was cast into a mold for a flat lens having a thickness of 2.5 mm and cured by polymerization in an oven by raising the temperature from 30° C. to 80° C. over 10 hours to prepare a lens. The prepared lens exhibited excellent heat resistance, physical properties, transparency and surface conditions and showed few striae and little deformation on the surface. The refractive index and the Abbe number of the obtained lens are shown in Table 1.

Examples 2 to 20

The same procedures as those conducted in Example 1 were conducted except that the compositions shown in Table 1 were used. The refractive indices and the Abbe numbers of the obtained lenses are shown in Table 1.

Comparative Examples 1 to 8

The same procedures as those conducted in Example 1 were conducted except that the compositions shown in Table 2 were used. The refractive indices and the Abbe numbers of the obtained lenses are shown in Table 2.

TABLE 1

| | Composition (parts by weight) | Refractive index | Abbe number |
|---|---|---|---|
| Example 1 | 1,2-bis(β-epithiopropylthio)ethane/sulfur = 90/10 | 1.72 | 34 |
| Example 2 | 1,2-bis(β-epithiopropylthioethyl)sulfide/sulfur 90/10 | 1.72 | 34 |
| Example 3 | bis(β-epithiopropyl)sulfide/sulfur = 90/10 | 1.72 | 34 |
| Example 4 | bis(β-epithiopropyl)sulfide/sulfur = 86/14 | 1.73 | 34 |
| Example 5 | bis(β-epithiopropyl)sulfide/selenium sulfide = 96/4 | 1.72 | 35 |
| Example 6 | bis(β-epithiopropyl)sulfide/sulfur/selenium sulfide = 85/12/3 | 1.74 | 33 |
| Example 7 | 2,5-bis(β-epithiopropylthiomethyl)-1,4-dithane/sulfur = 90/10 | 1.72 | 34 |
| Example 8 | bis(β-epithiopropyl)disulfide/sulfur = 90/10 | 1.75 | 33 |
| Example 9 | bis(β-epidithiopropyl)sulfide/sulfur = 90/10 | 1.77 | 31 |
| Example 10 | bis(β-epidithiopropyl)disulfide/sulfur = 90/10 | 1.78 | 30 |
| Example 11 | 1,2-bis(β-epithiopropylthio)ethane/selenium = 97/3 | 1.72 | 34 |

TABLE 1-continued

| | Composition (parts by weight) | Refractive index | Abbe number |
|---|---|---|---|
| Example 12 | bis(β-epithiopropyl)sulfide/sulfur/bis(2-mercaptoethyl)sulfide = 90/5/5 | 1.72 | 35 |
| Example 13 | bis(β-epithiopropyl)sulfide/sulfur/n-butyl thioglycolate = 90/5/5 | 1.72 | 35 |
| Example 14 | bis(β-epithiopropyl)disulfide/selenium sulfide/bis(2-mercaptoethyl)sulfide = 92/3/5 | 1.75 | 33 |
| Example 15 | bis(β-epithiopropyl)disulfide/lead selenide/n-butyl thioglycolate = 92/3/5 | 1.77 | 32 |
| Example 16 | bis(β-epithiopropyl)sulfide/carbon disulfide = 95/5 | 1.72 | 34 |
| Example 17 | bis(β-epithiopropyl)sulfide/carbon disulfide = 80/20 | 1.74 | 31 |
| Example 18 | 1,2-bis(β-epithiopropylthioethyl)sulfide/carbon disulfide = 80/20 | 1.74 | 31 |
| Example 19 | bis(β-epithiopropyl)selenide/sulfur = 90/10 | 1.75 | 32 |
| Example 20 | bis(β-epithiopropyl)selenide/selenium sulfide = 96/4 | 1.74 | 33 |

TABLE 2

| | Composition (parts by weight) | Refractive index | Abbe number |
|---|---|---|---|
| Comparative Example 1 | 1,2-bis(β-epithiopropylthio)ethane = 100 | 1.70 | 36 |
| Comparative Example 2 | 1,2-bis(β-epithiopropylthioethyl)sulfide = 100 | 1.70 | 36 |
| Comparative Example 3 | bis(β-epithiopropyl)sulfide = 100 | 1.70 | 36 |
| Comparative Example 4 | 2,5-bis(β-epithiopropylthiomethyl)-1,4-dithiane = 100 | 1.70 | 36 |
| Comparative Example 5 | bis(β-epithiopropyl)disulfide = 100 | 1.73 | 34 |
| Comparative Example 6 | bis(β-epidithiopropyl)sulfide = 100 | 1.75 | 32 |
| Comparative Example 7 | bis(β-epidithiopropyl)disulfide = 100 | 1.76 | 31 |
| Comparative Example 8 | bis(β-epithiopropyl)selenide = 100 | 1.73 | 34 |

Example 21

In an atmosphere of nitrogen, 85 parts by weight of bis(β-epithiopropyl)sulfide and 15 parts by weight of sulfur were mixed at 100° C. for 1 hour while being stirred. After the mixture was cooled, 0.05 part by weight of tetrabutylammonium chloride as the catalyst was added and a homogeneous solution was prepared. The prepared solution was filtered through a PTFE filter of 0.5 μm, cast into a mold for a flat lens having a thickness of 2.5 mm and cured by polymerization in an oven by raising the temperature from 10° C. to 120° C. over 22 hours to prepare a lens. The prepared lens exhibited excellent heat resistance, physical properties, transparency and surface conditions and showed few striae and little deformation on the surface. The refractive index and the Abbe number of the obtained lens are shown in Table 3.

Examples 22 and 23

The same procedures as those conducted in Example 21 were conducted except that the compositions shown in Table 3 were used. The refractive indices and the Abbe numbers of the obtained lenses are shown in Table 3.

Example 24

In an atmosphere of nitrogen, 30 parts by weight of bis(2-mercaptoethyl)sulfide and 8 parts by weight of sulfur were mixed at 100° C. for 1 hour while being stirred. After the mixture was cooled, 62 parts by weight of divinylbenzene, 0.02 part by weight of triethylbenzylammonium chloride as the catalyst and 0.3 parts by weight of 1,1-azobis(cyclohexane-1-carbonitrile) as the radical polymerization initiator were added and a homogeneous solution was prepared. The prepared solution was filtered through a PTFE filter of 0.5 μm, cast into a mold for a flat lens having a thickness of 2.5 mm and cured by polymerization in an oven by raising the temperature from 10° C. to 120° C. over 22 hours to prepare a lens. The prepared lens exhibited excellent heat resistance, physical properties, transparency and surface conditions and showed few striae and little deformation on the surface. The refractive index and the Abbe number of the obtained lens are shown in Table 3.

Example 25

The same procedures as those conducted in Example 21 were conducted except that the composition shown in Table 3 was used. The refractive index and the Abbe number of the obtained lens are shown in Table 3.

Example 26

In an atmosphere of nitrogen, 65 parts by weight of bis(β-epithiopropyl)sulfide, 35 parts by weight of sulfur and 0.2 parts by weight of dibenzothiazyl disulfide as the catalyst for preliminary polymerization were mixed at 50° C. for 24 hour while being stirred. Although a portion of sulfur remained undissolved in bis(β-epithiopropyl)sulfide in the early period of the mixing, sulfur was completely dissolved after about 12 hours. After the mixture was cooled, 0.02 part by weight of tetrabutylammonium chloride as the catalyst was added and a homogeneous solution was prepared. The prepared solution was filtered through a PTFE filter of 0.5 μm, cast into a mold for a flat lens having a thickness of 2.5 mm and cured by polymerization in an oven by raising the temperature from 10° C. to 120° C. over 22 hours to prepare a lens. The prepared lens exhibited excellent heat resistance, physical properties, transparency and surface conditions and showed few striae and little deformation on the surface. The refractive index and the Abbe number of the obtained lens are shown in Table 3.

TABLE 3

| | Composition (parts by weight) | Refractive index | Abbe number |
|---|---|---|---|
| Example 21 | bis(β-epithiopropyl)sulfide/sulfur = 85/15 | 1.73 | 34 |
| Example 22 | 1,2,3-tris(β-epithiopropylthio)propane/sulfur = 75/25 | 1.76 | 31 |
| Example 23 | bis(β-epithiopropyl)selenide/sulfur/selenium sulfide = 85/12/3 | 1.75 | 32 |
| Example 24 | bis(2-mercaptoethyl)sulfide/sulfur/divinylbenzene = 30/8/62 | 1.64 | 28 |
| Example 25 | bis(β-epithiopropl)sulfide/lead selenide = 98/2 | 1.71 | 35 |
| Example 26 | bis(β-epithiopropyl)sulfide/sulfur = 63/35 | 1.79 | 28 |

What is claimed is:

1. An optical material obtained by curing a composition which comprises a mixture of (a) a compound having two or more structures represented by formula (1) in one molecule and (b) one or more inorganic compounds comprising at least one atom selected from the group consisting of sulfur atom and selenium atom, formula (1) being:

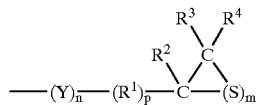

(1)

wherein $R^1$ represents a hydrocarbon group having 1 to 10 carbon atoms, $R^2$, $R^3$ and $R^4$ each represents hydrogen atom or a hydrocarbon group having 1 to 10 carbon atoms, Y represents O, S, Se or Te, m represents a number of 1 to 5, n represents a number of 0 to 5 and p represents 0 or 1.

2. The optical material according to claim 1, wherein the (b) one or more inorganic compounds comprising at least one atom of sulfur atom and selenium atom is sulfur, carbon disulfide, selenium, lead selenide or selenium sulfide.

3. The optical material according to claim 1, wherein said (a) compounds having two or more structures represented by the formula (1) is a compound represented by formula (2):

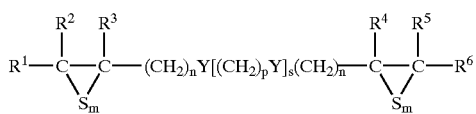

(2)

wherein $R^1$ to $R^6$ each represents hydrogen atom or a hydrocarbon group having 1 to 10 carbon atoms, Y represents O, S, Se or Te, p represents a number of 1 to 6, s represents a number of 0 to 4, m represents a number of 1 to 5 and n represents 0 or 1.

4. The optical material according to claim 1, wherein the (b) one or more inorganic compounds comprising at least one atom selected from the group consisting of sulfur atom and selenium atom includes both sulfur atom and selenium atom.

5. The optical material according to claim 1, wherein the composition includes at least 10% by weight of said (a) compound having two or more structures represented by the formula (1) in one molecule.

6. The optical material according to claim 5, wherein the composition includes at least 1% by weight of said (b) one or more inorganic compounds comprising at least one atom selected from the group consisting of sulfur atom and selenium atom.

7. The optical material according to claim 6, wherein the composition includes said (b) one or more inorganic compounds comprising at least one atom selected from the group consisting of sulfur atom and selenium atom in an amount of 1 to 50 parts by weight per 100 parts by weight of said (a) compound having two or more structures represented by formula (1) in one molecule.

8. The optical material according to claim 1, wherein the composition includes said (b) one or more inorganic compounds comprising at least one atom selected from the group consisting of sulfur atom and selenium atom in an amount of 1 to 50 parts by weight per 100 parts by weight of said (a) compound having two or more structures represented by formula (1) in one molecule.

9. The optical material according to claim 1, wherein the composition includes at least 1% by weight of said (b) one or more inorganic compounds comprising at least one atom selected from the group consisting of sulfur atom and selenium atom.

10. An optical lens comprising the optical material described in claim 1.

11. An optical lens comprising the optical material described in claim 2.

12. A process for obtaining the optical material according to claim 1, comprising curing said composition by polymerization.

13. A process for obtaining the optical material according to claim 2, comprising curing said composition by polymerization.

14. The process according to claim 12, wherein said curing is performed in the presence of a curing catalyst.

15. The process according to claim 14, wherein the curing catalyst is included in an amount of 0.001 to 10.0 parts by weight per 100 parts by weight of said composition.

16. The process according to claim 13, wherein said curing is performed in the presence of a curing catalyst.

17. The process according to claim 16, wherein the curing catalyst is included in an amount of 0.001 to 10.0 parts by weight per 100 parts by weight of said composition.

* * * * *